Nov. 3, 1925.  
R. CAMPBELL  
1,560,464  
ADVERTISING INSERT FOR MOTOR VEHICLE TAIL LIGHTS  
Filed Feb. 2, 1925
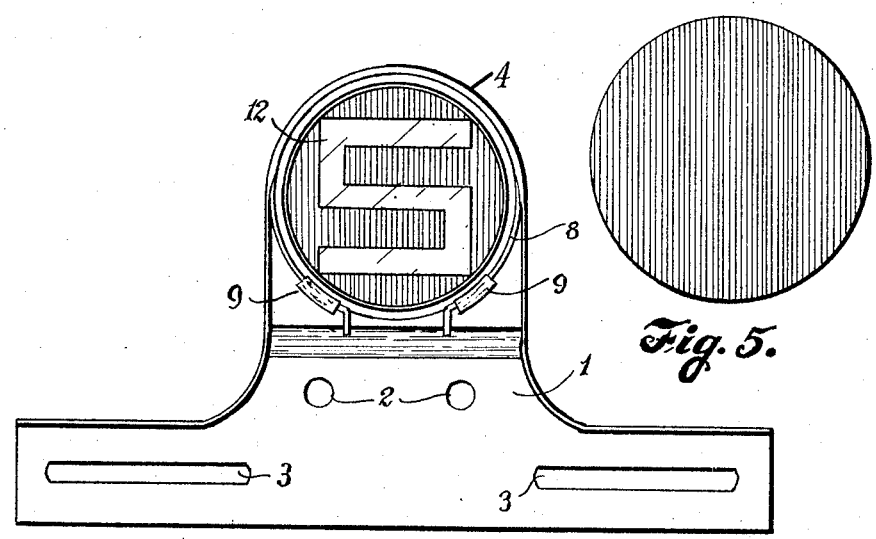
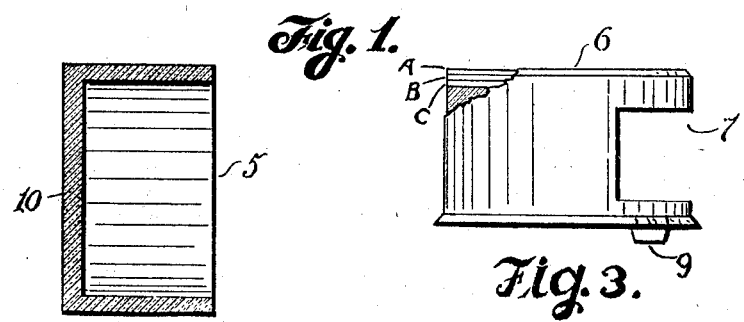
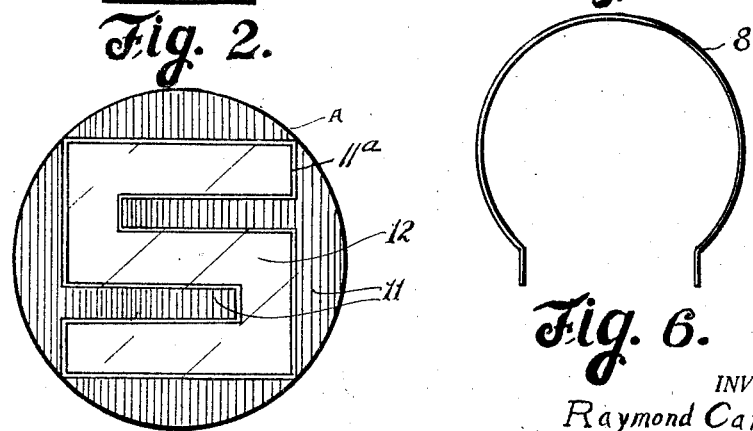
INVENTOR.  
Raymond Campbell  
BY John M. Spellman  
ATTORNEYS.

Patented Nov. 3, 1925.

1,560,464

UNITED STATES PATENT OFFICE.

RAYMOND CAMPBELL, OF DALLAS, TEXAS.

ADVERTISING INSERT FOR MOTOR-VEHICLE TAIL LIGHTS.

Application filed February 2, 1925. Serial No. 6,439.

*To all whom it may concern:*

Be it known that I, RAYMOND CAMPBELL, a citizen of the United States, residing at Dallas, in the county of Dallas and State of Texas, have invented certain new and useful Improvements in Advertising Inserts for Motor-Vehicle Tail Lights, of which the following is a specification.

This invention relates to motor vehicle rear or tail lamps or lights and in such connection it has more particular reference to means for displaying advertisements thereon.

The primary object of the invention is to utilize the red colored disk of a tail lamp to display advertisements and at the same time not interfere with the shining of the light as a danger signal.

Another object of the invention is that the lettering or other advertisement may be produced economically and changed as required to suit individual requirements.

The invention will be better and more clearly understood by reference to the following detailed description in connection with the accompanying drawings and wherein:

Figure 1 is a side elevational view of a motor vehicle tail lamp illustrating the embodiment therein of the tail light advertising disk.

Figure 2 is a sectional view of a glass covering for the light globe.

Figure 3 is a side view of a metallic housing for the glass cover, with part broken away, and showing the interior arrangement of the inserts used with the advertising disk.

Figure 4 is a front view of a partly colored, translucent disk comprising the main part of the invention.

Figure 5 is a view of a full red colored translucent disk, partly reduced in size for the sake of convenience of illustration.

Figure 6 is a view of a spring band to lock and hold the parts together.

Referring more in detail to the drawings, 1 denotes a frame with holes 2—2 for bolts for attaching the frame to a bar preferably arranged within the radial space of an automobile emergency tire support, and 3—3 are slots for affixing to the frame the license numbers of the vehicle. The rounded portion 4 of the frame carries an electric lamp globe with a cover 5 and a housing 6 for the cover, with light exit 7 and a spring band 8 for holding the parts together. The frame has ears 9—9 to support the band in position.

The above members are not claimed, however, as part of the invention, being merely shown and described for a clear understanding of the same. The invention consists principally of a disk A of any suitable material and of a red color on all of that portion thereof indicated at 11. This red colored portion is translucent, that is the light from an electric globe may shine through said red colored portion. This red colored portion is spaced apart from the outer margin of a letter or symbol, a letter S colored blue (or other color) being shown in the drawing, and between the margins of said letter and the red colored portion of the material forming the disk the coloring is omitted, being a transparent, colorless portion or marginal outline $11^a$.

A second, entirely white translucent disk B of the same diameter as disk A is provided for insertion behind the disk A and both disks A and B are then placed upon the face 10 of the glass cover 5, the white disk underneath the disk A. This arrangement has the effect of producing by contrast a sharper and clearer outline of the symbols on disk A. The disk B being translucent, permits the light to pass through this disk and also through disk A and simultaneously reveals the red danger signal and the lettering. The signal and lettering are thus clearly visible both by night and day.

To increase the red color an additional fully covered red translucent disk C is provided and may be placed underneath the disk B. Or if preferred only the red disk A with the lettering alone may be employed. The disk A will thus clearly reveal both the danger signal and the lettering if used alone.

What is claimed is:

An advertising insert for vehicle tail lamps, in combination with the lamp, said insert comprising a disk, a blue letter occupying the central portion of the disk, said letter having a transparent non-colored outline on both inner and outer margins, the remaining portion of the disk being red colored, and both the letter and the red colored portion of the disk being translucent, the red colored portion of the disk for the purpose of displaying a danger signal, and the letter being used for advertisements; and an entirely white translucent disk and a completely red translucent disk arranged beneath the lettered disk.

In testimony whereof I have signed my name to this specification.

RAYMOND CAMPBELL.